No. 619,042. Patented Feb. 7, 1899.
H. F. HODGES.
ICE MACHINE.
(Application filed July 15, 1895.)
(No Model.)
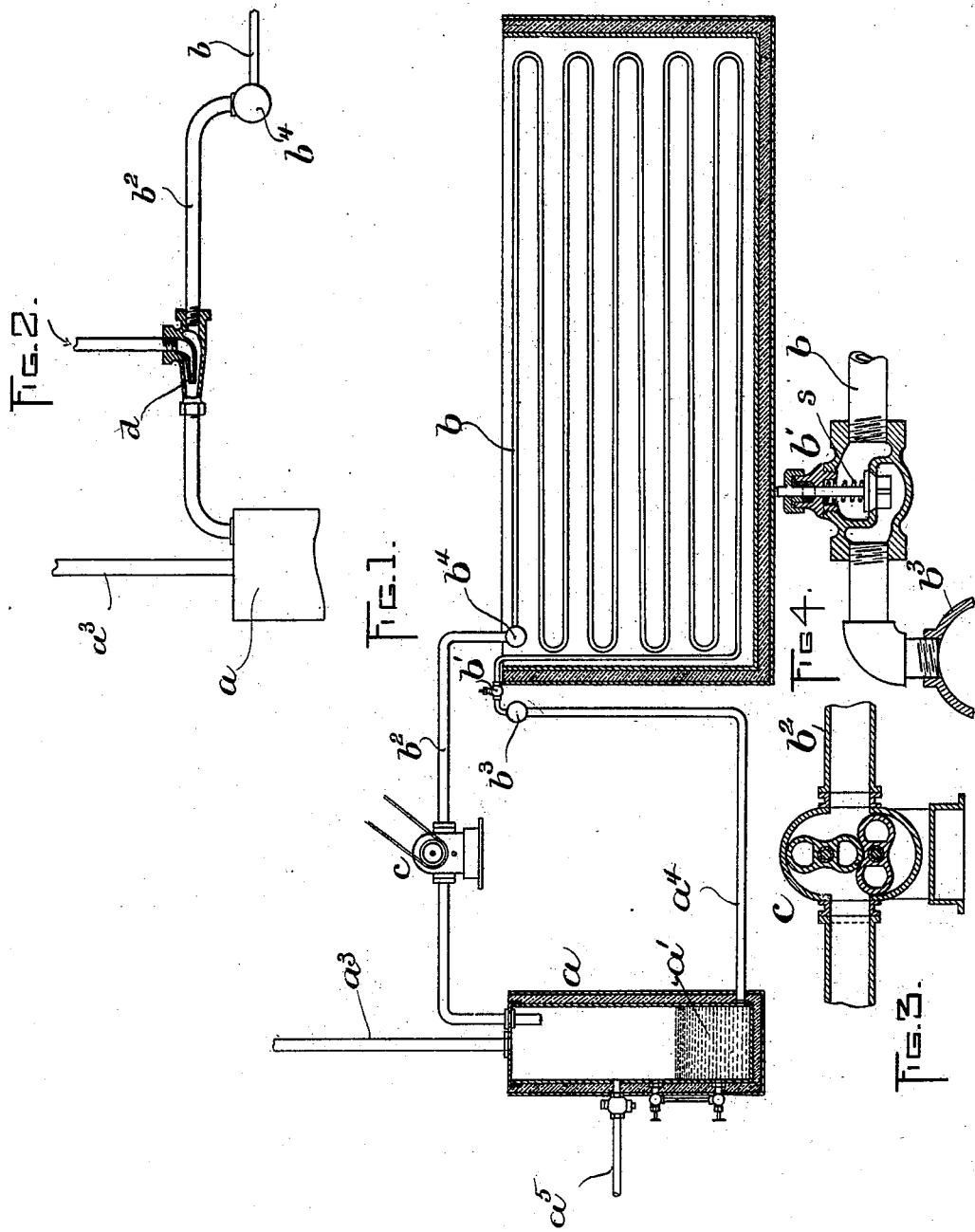
WITNESSES:
INVENTOR:

UNITED STATES PATENT OFFICE.

HORACE F. HODGES, OF BOSTON, MASSACHUSETTS, ASSIGNOR TO CHARLES B. SOUTHARD, TRUSTEE, OF SAME PLACE.

ICE-MACHINE.

SPECIFICATION forming part of Letters Patent No. 619,042, dated February 7, 1899.

Application filed July 15, 1895. Serial No. 555,986. (No model.)

*To all whom it may concern:*

Be it known that I, HORACE F. HODGES, of Boston, in the county of Suffolk and State of Massachusetts, have invented certain new and useful Improvements in Ice-Machines, of which the following is a specification.

This invention relates to refrigerating apparatus employing expansion-coils through which a volatile liquid is circulated; and it consists in certain improvements, hereinafter described, whereby, first, an accelerated circulation of the volatile liquid through the expansion-coils is obtained, and, second, a higher initial pressure is created on the suction side of the compressor without increasing the evaporating-pressure in the expansion-coils.

Of the accompanying drawings, forming a part of this specification, Figure 1 is an elevation, partly in section, showing an apparatus embodying my invention, wherein a pressure-blower is employed to move the combined liquid and gas. Fig. 2 represents a modification showing an injector operated by the liquid entering from the condenser, said injector performing the office of the blower shown in Fig. 1. Fig. 3 is a detail sectional view of one form of pressure-blower that may be employed as in Fig. 1. Fig. 4 is a detail sectional view of a simple form of pressure-regulator indicated in Fig. 1.

The same letters of reference indicate the same parts in all the figures.

In the drawings, $a$ is a receptacle, which I call a "separator" or "trap." Said trap is kept partly filled with the volatile liquid $a'$ employed and is provided midway of its height with a glass gage-tube indicating the height of the liquid therein. The trap is preferably constructed with double walls, the space between being filled with mineral wool or other non-conductor of heat.

$b$ is an evaporating-coil of ordinary construction. In practice there will usually be a series of these coils, all connected by a header $b^3$ with a supply-pipe $a^4$ and by a header $b^4$ with an outlet-pipe $b^2$. Each coil is preferably provided with a throttling-valve $b'$, for a purpose hereinafter explained. Said throttling-valve may be an automatic pressure-reducing valve, such as shown in Fig. 4, in which a spring $s$ is employed to keep the valve from opening until the pressure in the header $b^3$ has the desired degree greater than that in the coil $b$. The outlet-pipe $b^2$ enters the upper portion of the trap $a$.

$c$ is pressure blower or pump, of any suitable construction, connected with the outlet-pipe $b^2$ and adapted to increase the pressure of the gas and liquid passing through it—say from one to fifteen pounds per square inch.

Leading from the top of the trap $a$ to the compressor is the usual conduit $a^3$ to conduct the saturated gas to the compressor. (Not shown.) From near the bottom of the trap $a$ a pipe $a^4$ leads to the induction-header $b^3$ of the expansion-coils $b$ and conveys liquid to said coils, as hereinafter more fully described.

$a^5$ is the valved expansion-pipe through which the liquid refrigerant from the condenser (not shown) enters the trap $a$ to compensate for the evaporation in the coils $b$.

The operation is as follows: Liquid enters the upper portion of the trap from the expansion-coils and falls to the bottom of the trap $a$, (shown at $a'$.) The pressure blower or pump causes the pressure in the trap to exceed that in coils $b$, and therefore the liquid $a'$ is forced forward through header $b^3$ and valves $b'$ into coils $b$, completely filling the same. The valve $b'$ is preferably constructed to act automatically and may be of the construction shown in Fig. 4, a spring $s$ being employed to hold the valve to its seat and permit the valve to open under a predetermined pressure. The valve $b'$ should be provided with regulating means, so that any desired difference in pressure may exist between the liquid coming to it and the liquid passing from it. An adjustable weight contained within the casing of the valve may be substituted for the spring, or the valve may be constructed to be regulated by hand instead of being automatic, in which case it would be an ordinary throttling-valve. The liquid passes from the coils through header $b^4$ and pipe $b^2$ to the pump $c$, and from the pump back to its original starting-place in trap $a$, to repeat the circuit indefinitely, the circulation being regulated by the throttle-valves $b'$. In its passage through the coils $b$ the liquid has been partially evaporated by the heat of the walls of the coils, and as the said liquid enters the trap $a$ this gas separates from the unevaporated liquid and passes to the compressor through the pipe $a^3$, but with the increase of pressure due to the pump $c$. This accelerated movement of the liquid causes a more rapid absorption of heat in the coils $b$, and also utilizes their entire surface, for it is to be remembered that heat is not absorbed to any noteworthy extent except on surfaces covered with liquid, gas being a very poor conductor and having little capacity for heat. The rate of movement and of evaporation of the liquid in the coils may be accurately regulated by the valves $b'$. The accelerated movement of the liquid in the coils therefore materially increases the efficiency of the coils for evaporation, such movement being caused by the pressure of the gas on the surface of the liquid in the trap $a$. This pressure also increases the density of the gas passing to the compressor, increasing the efficiency of the latter to a very marked extent. Assuming the pressure in the coils $b$ to be ten pounds (or twenty-five pounds absolute) and that this pressure is increased fifteen pounds in the trap $a$ by use of the pump $c$, making forty pounds absolute pressure, or sixty per cent. increase, (the density increasing directly as the pressure,) the compressor would handle sixty per cent. more gas per stroke.

In the ordinary refrigerating-machine liquid passes from the condenser into the expansion-coils at their lower portions, partially filling them, and the gas formed by evaporation passes directly from the upper portions of the coils to the compressor. It is not feasible, therefore, with the ordinary apparatus to completely fill the coils with liquid, as the liquid would probably be carried forward to the compressor with the gas, endangering the machine and lessening its efficiency by the evaporation of a portion of the liquid outside of the evaporating-coils, where the evaporation is useless. The temperature of evaporation or boiling-point is dependent on the pressure under which the liquid passes through the coils, the temperature being lower as the pressure decreases. On the contrary, any decrease in pressure in the coils lessens the density of the gas, and thus reduces the efficiency of the compressor. Furthermore, the more the liquid in the coils is agitated the more freely it absorbs heat from the walls of the coils. It will be seen that my improved apparatus induces a less pressure in the evaporating-coils than exists in the pipe leading thence to the compressor, causes the liquid in the evaporating-coils to flow repeatedly through and through said coils till it is all changed to vapor, and prevents liquid passing to the compressor with the gas.

In Fig. 2 I show a modification comprising an ejector $d$, operated by the ammonia entering from the condenser and arranged to induce a higher pressure in the trap $a$ than in the coils $b$, said ejector being a substitute for the pump $c$ and performing a similar function.

I do not limit myself to the relative arrangement of the parts of the apparatus here shown nor to the specific construction of the said parts, as all of these may be variously modified without departing from the spirit of my invention.

I claim—

1. A refrigerating apparatus comprising an expansion-coil; a receiver or trap having a conduit connecting its upper portion with a compressor; a connection between the discharging end of the coil and the upper portion of the trap, through which the gas and liquid from the coil pass to the trap, where they are separated, the liquid falling to the lower portion of the trap, while the gas passes through said conduit to the compressor; a connection between the lower portion of the trap and the receiving end of the expansion-coil said connection having no communication with the connection from the coil to the trap; a pressure-increasing device acting on the gas and liquid in the trap, whereby the movement of the liquid through said coil is accelerated, and a throttling-valve whereby the rate of movement of the liquid through the coil may be regulated.

2. A refrigerating apparatus comprising an expansion-coil; a receiver or trap having a conduit connecting its upper portion with a compressor; a connection between the discharging end of the coil and the upper portion of the trap, through which the gas and liquid from the coil pass to the trap, where they are separated, the liquid falling to the lower portion of the trap, while the gas passes through said conduit to the compressor; a connection between the lower portion of the trap and the receiving end of the expansion-coil and entirely independent of the first-mentioned connection; a mechanical pressure-increasing device located in the connection between the discharging end of the coil and the trap, whereby the pressure of the returning gas and liquid is increased, and a throttling-valve whereby the rate of movement of the liquid through the coil may be regulated.

In testimony whereof I have signed my name to this specification, in the presence of two subscribing witnesses, this 1st day of July, A. D. 1895.

HORACE F. HODGES.

Witnesses:
 C. F. BROWN,
 A. D. HARRISON.